United States Patent [19]
Squibb

[11] Patent Number: 6,158,019
[45] Date of Patent: Dec. 5, 2000

[54] SYSTEM AND APPARATUS FOR MERGING A WRITE EVENT JOURNAL AND AN ORIGINAL STORAGE TO PRODUCE AN UPDATED STORAGE USING AN EVENT MAP

[75] Inventor: Mark D. Squibb, Republic, Mo.

[73] Assignee: Delta-Tek Research, Inc., Montreal, Canada

[21] Appl. No.: 08/971,199

[22] Filed: Nov. 14, 1997

Related U.S. Application Data

[60] Provisional application No. 60/030,998, Dec. 15, 1996.

[51] Int. Cl.[7] ................................................... G06F 11/00
[52] U.S. Cl. ............................................. 714/13; 714/20
[58] Field of Search ................................. 714/13, 5, 6, 7, 714/15, 16, 18, 20, 31, 39, 41, 42, 770, 769, 8, 47; 395/620, 618, 600, 575; 711/114, 115, 133

[56] References Cited

U.S. PATENT DOCUMENTS

| | | | |
|---|---|---|---|
| 5,086,502 | 2/1992 | Malcolm | 395/575 |
| 5,212,784 | 5/1993 | Sparks | 395/575 |
| 5,325,519 | 6/1994 | Long et al. | 395/575 |
| 5,375,234 | 12/1994 | Davidson et al. | 395/600 |
| 5,404,508 | 4/1995 | Konrad et al. | 395/600 |
| 5,426,774 | 6/1995 | Banerjee et al. | 395/575 |
| 5,435,004 | 7/1995 | Cox et al. | 395/575 |
| 5,479,654 | 12/1995 | Squibb | 395/600 |
| 5,535,381 | 7/1996 | Kopper | 395/600 |
| 5,574,882 | 11/1996 | Menon et al. | 395/441 |
| 5,596,710 | 1/1997 | Voigt | 395/182.17 |
| 5,604,862 | 2/1997 | Midgely et al. | 395/182.04 |
| 5,617,566 | 4/1997 | Malcolm | 395/620 |
| 5,638,509 | 6/1997 | Dumphy et al. | 395/182.18 |
| 5,640,561 | 6/1997 | Satoh et al. | 395/618 |
| 5,649,152 | 7/1997 | Ohran et al. | 395/441 |
| 5,675,725 | 10/1997 | Malcolm | 395/182.04 |
| 5,692,121 | 11/1997 | Bozso et al. | 395/182.11 |
| 5,713,024 | 1/1998 | Halladay | 395/712 |
| 5,720,026 | 2/1998 | Uemura et al. | 395/182.04 |
| 5,737,514 | 4/1998 | Stiffler | 395/182.11 |
| 5,765,173 | 6/1998 | Cane et al. | 707/204 |
| 5,774,643 | 6/1998 | Lubbers et al. | 395/182.18 |

Primary Examiner—Nadeem Iqbal
Attorney, Agent, or Firm—Baker & McKenzie

[57] ABSTRACT

A method and apparatus for restoring an updated computer storage from a journal of write events and a copy of an original storage generates an event map from the journal of write events. The event map permits efficient combination of the contents of the write event journal and the original storage. The event map also enables translation of the event journal into a delta expressing the differences between the original and updated storages. The event map similarly permits efficient merging of a write event journal and an original file stored streaming tape.

51 Claims, 12 Drawing Sheets

FIG. 1D

| EVENT ADDRESS (22) | EVENT SIZE (23) | EVENT DATA (24) | EVENT DATA ADDRESS (25) |
|---|---|---|---|
| 0 | 5 | abcde | 16 |
| 15 | 4 | fghi | 37 |
| 8 | 5 | jklmn | 57 |
| 21 | 3 | opq | 78 |
| 2 | 15 | rstuvwxyz123456 | 97 |

| MARKER ORIGIN ADDRESS (26) | MARKER EVENT SPAN (27) | MARKER DATA POINTER (28) |
|---|---|---|
| 0 | 2 | 16 |
| 2 | 15 | 97 |
| 17 | 2 | 39 |
| 21 | 3 | 78 |

} 29

```
          1111111111222222222233    } 5
0123456789012345678901234567890

OLD_DATA_NOW_AND_THEN_SOME_MORE    } 6 abrstuvwxyz123456hiENopqME_MORE    } 19
```

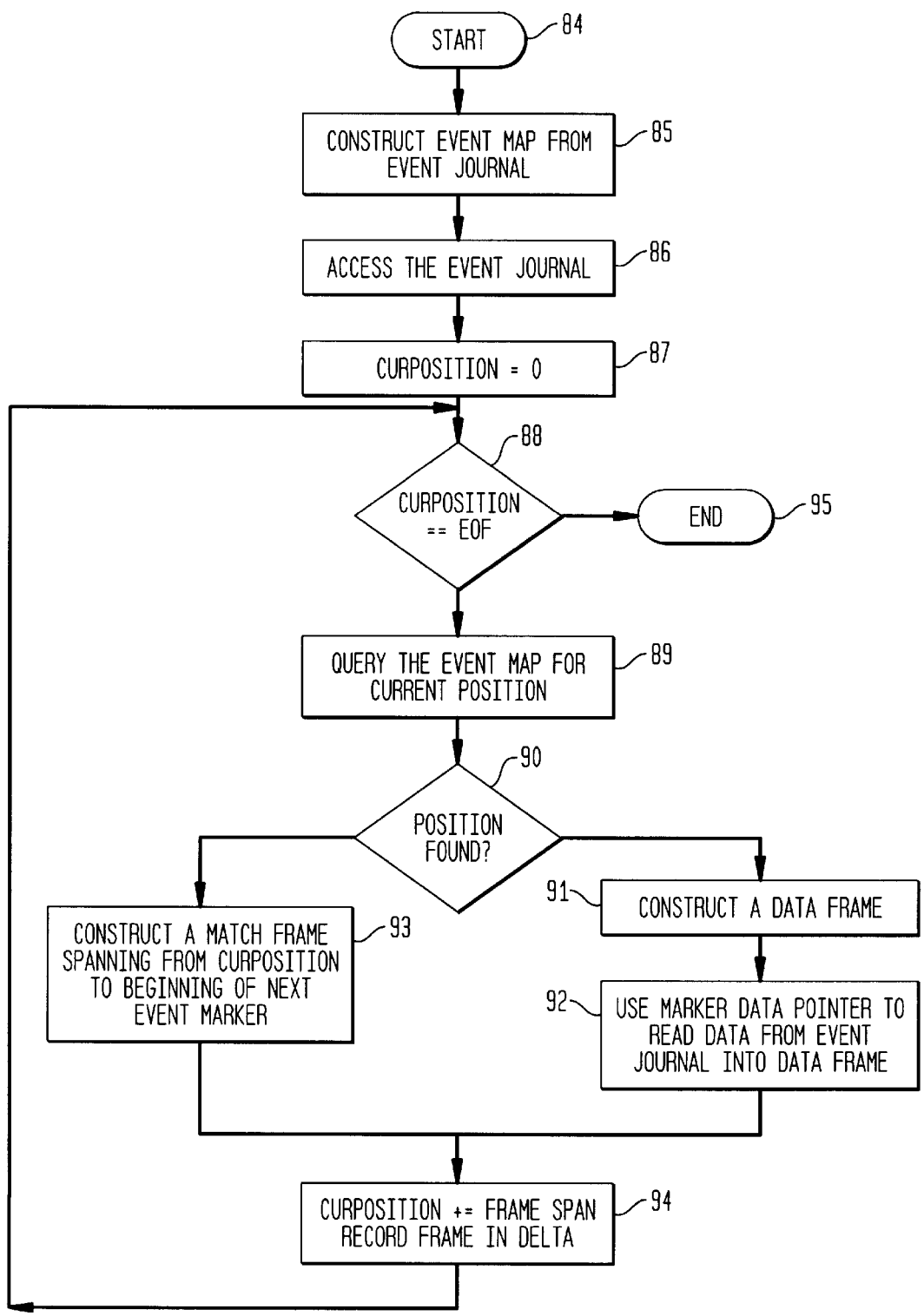

SYSTEM AND APPARATUS FOR MERGING A WRITE EVENT JOURNAL AND AN ORIGINAL STORAGE TO PRODUCE AN UPDATED STORAGE USING AN EVENT MAP

CROSS-REFERENCE TO RELATED APPLICATIONS

This application claims the benefit of the U.S. Provisional Patent Application No. 60/030,998, filed on Dec. 15, 1996, and entitled JOURNAL INDEXING SERVICES AND SERVICE KIT. The U.S. Provisional Patent Application No. 60/030,998 is incorporated herein in its entirety by reference thereto.

REFERENCE TO PAPER APPENDIX

This application incorporates by reference the computer program listing contained in the attached paper appendix. The paper appendix includes 471 pages.

1. Field of the Invention

The present invention relates to improvements in the field of computer systems having backup/restore or archive/retrieve subsystems. More particularly, the present invention relates to a method and apparatus to efficiently protect and archive active data to streaming media.

2. Background Information

In a data processing system, a backup/restore subsystem, usually referred to as a backup subsystem, is typically used to save a recent copy of an active file and several earlier versions. There are, for example, three general strategies employed by backup systems. First, full backup periodically copies all files from a client system's storage to a backup server. A second strategy includes incremental backup, where the client system copies only the modified files to the backup server. In a third strategy, a delta backup copies only the modified portions of the modified files to the backup server.

Complete discussions of various backup and storage technologies are disclosed, for example in U.S. Pat. No. 5,479,654 entitled APPARATUS AND METHOD FOR RECONSTRUCTING A FILE FROM A DIFFERENCE SIGNATURE AND AN ORIGINAL FILE, which is hereby incorporated by reference. Applicants co-pending applications entitled COMPUTER APPARATUS AND METHOD FOR MERGING A SEQUENTIAL PLURALITY OF DELTA STREAMS, Attorney Docket No. HP-10951196-1, filed Nov. 14, 1997, and COMPUTER APPARATUS AND METHOD FOR MERGING SYSTEM DELTAS, Attorney Docket No. HP-10960109, filed Nov. 30, 1995, also relate to backup and storage technologies and are hereby incorporated by reference. In addition, the Storage Service Kit, ©1996 by Mark Squibb also relates to data storage systems and is hereby incorporated by reference.

It is apparent to those skilled in the art that in any given backup system, the higher the backup frequency, the more accurate the backup copy will represent the present state of the data within a file. Considering the large volume of data maintained and continuously generated in a data processing system, the amount of storage, time and other resources associated with protecting data are very substantial. Thus, those skilled in the art are continuously engaged in searching for better and more efficient ways to provide data protection.

The time lag between the last backup, for example by the backup methods described above, and the current data on an active system represents risk of data loss. This "protection gap" is an active concern among computer users because it represents unprotected information. Mirroring systems, described below, partially overcome this gap.

It is well known in the art to capture write events to a storage system. For example, each time a change is made to a storage device, the change is recorded or logged into a second media. A variety of types of media have been used for recording of logs including, for example, streaming tape, hard disk, and remote hard disk.

A write event comprises, for example, a storage indicator indicating what storage component or device the write applies to, a position indicator within the component or event as an offset telling where in the storage the write occurred, and the data (e.g., event data) which was written. Various embodiments also include time or sequence markers for synchronization to identify or select points in time and to coordinate state information across storage boundaries. A collection of write events is known as an event log, referred to as an event journal when the event log is stored on a storage device.

Since events are recorded just after they occur, event logs are ordered in chronological sequence. Events at the beginning of the journal occurred before events at the end of the journal. Creation of event logs is well known in the art. Replaying event logs to re-enact changes to a storage component is also well known in the art.

Prior art systems use event journals to replay changes to random access writeable media. The word "replay" means, for example, to chronologically re-enact the storage write events that resulted in a particular file given an original file. The replay process begins with a disk file on random access storage and an event log synchronized with the disk file. The initial file's Data State, for example, must correspond to the starting instant of the event log. The events in the event log are repeated on the disk file in the sequence that they occur in the log.

Each event is read from the event journal in sequence from beginning to end. After each event is read, the corresponding event offset is located in the disk file. This location process usually involves repositioning in the disk file to a random position that may be before or after the position of the last event offset. The event data is then written to the file at the new offset. Old information in the file is destroyed because the new data overlays the prior data. This process is repeated until the event log is exhausted. When the process completes, data in the revised file represents the final Data State represented by the event log.

Mirror systems duplicate changes as they occur. Storage devices are usually treated as block devices. When change occurs, a write event is packaged and transmitted to a remote mirror system. Upon receipt, the remote mirror duplicates the change in the mirror storage. Mirror systems sometimes employ event logs to store events.

Event logs are used in mirroring systems for several purposes. For example, event logs are used in mirroring systems to compensate for transmission delays at the source system. At the mirror system, event logs are used to cache events when the mirrored storage cannot keep up with incoming write events. It is also known to temporarily halt incoming events to a mirror system so that the data to the mirror system is constant during backup of the mirror.

From a data protection perspective, there are two types of events that compromise data access. The first and best understood is a hardware failure. Mirroring effectively prevents a hardware failure from compromising business continuance. The second event type is a logical failure. A logical failure occurs when a user, operator or application does something that destroys, corrupts or distorts information. Mirroring systems immediately and irreversibly duplicate logical errors.

Mirroring systems have several deficiencies. For example, mirroring does not protect from logical failures. In addition, the need to re-execute every write event on another random-access storage device shortly after the initial event effectively requires duplication of all active storage in a second storage system. The cost of the extra second storage and the management overhead prevents widespread adoption of mirroring technology.

Mirroring does eliminate the data protection gap inherent with backup technology. Mirrored systems immediately protect new data, unless it is destroyed by a logical failure. The volatile nature of mirrored storage, however, is a deficiency. The cost of duplicating massive storage is also a deficiency. In contrast, the present invention provides the same data protection as mirrored storage at much lower cost and provides recourse for logical errors.

Clustering is a type of mirroring. Clusters are a collection of servers that maintain a mirror distributed among several other servers on the network. Clustered servers share the logical fault intolerance and storage doubling characteristics of mirrored systems.

File mirroring systems are another type of mirroring. It is known in the art to have a many-to-one mirror, for example when a single system provides a logical mirroring service for a number of network servers. The single system collects change from the servers on a network. The change is stored or applied to a hard disk cache of active data files. Periodically the data file versions are backed up to tape. File mirror systems, however, share the same deficiencies as mirror systems because all active data must be stored on disk and included archive service provides random archive granularity. Also as indicated above, mirroring systems maintain a duplicate copy of the storage in case the primary storage system fails.

U.S. Pat. No. 5,086,502 to Malcolm describes an apparatus and method for recording an event journal to a backup storage means to provide backup to a primary storage drive. The Malcolm patent, however, explicitly requires that a random access storage device hold the base file. It is important to note that this process occurs in the order of the events recorded in the event journal. These events are recorded in the order that changes were made to the base file, and therefore are random with respect to position in the base stream. If the Malcolm system fails, a sequential list of write operations is replayed on a copy of the original data to restore the data set to the latest working instance. It is well known in the art to store write events and combine them with a backup copy to recover a database as of the latest instant. Thus, this technique requires first installing the base copy on random access media and second repeating all write events to the base copy on the disk. Accordingly, data recovery using Malcolm journals is restricted to randomly seekable and writeable storage means.

For example, a first event may indicate a write event of 100 bytes at offset 1000 in a base file (e.g., an original file) and, a second event may indicate a write event of 100 bytes at an offset of 500 in the same base file. In order for the journal of Malcolm to be used to recover a file by the specified method: the base file must first be placed on random access media; a seek to byte 1000 must occur followed by a write of the 100 bytes from the first write event; and the primary media must than seek to byte 500 and the 100 bytes relating to the second write event must be written to the primary media. This requirement to seek in the base file multiple times effectively prevents streaming media from being used in combination with Malcolm's journals or in the common precedent of using replaying database redo logs.

It is also well known in the art to use streaming media to backup data files. For example, prior art systems operate by copying data files to a streaming media. Streaming media is preferred primarily because of its low cost. Backup systems tend to be used for infrequent retrieval, and when such retrieval is required, data is usually required in the order in which it was recorded.

The combination of, for example, Malcolm and prior art backup systems does not contemplate operating in the absence of a primary storage media for the file to be restored or any means of combining a file stored on one streaming media to be merged with an event journal and written to another streaming storage. The prior art systems all require, for example, an intermediate step of placing the original file (which may be stored on streaming media) into a seekable media, such as a disk. Once the original file is on disk, then a history of write events can be written onto the original file, via seeking to the appropriate addresses on the disk, to recreate the latest version of the file.

In the field of information storage, a variety of media types are used. Streaming media, or tape, is dramatically cheaper than random access media. For most practical purposes, however, tape is not considered a readily seekable media. While most tape devices support positioning of media to a linear address, this positioning requires linear traversal of a very long media. This positioning takes a lot of time, and is used sparingly in practical applications.

Random access media permits information to be efficiently retrieved in an order different than it was laid out on the media. Streaming media is preferred for high volume applications, however, because of low cost and high capacity. Streaming media is much cheaper than equivalent random access media. Also, streaming tape devices have many times the capacity of random access devices. For example, a tape library may hold a thousand tapes, each tape having the capacity of 40 or more hard disks.

As a result, streaming storage devices are preferred places to store immense volumes of information. In this example, a single tape library is capable of holding as much information as 40,000 disk drives. The ability to concentrate and efficiently store huge volumes of information is a significant advantage in many applications, particularly when providing data protection services for large networks. The combination of lower storage cost plus much higher capacity are extremely important factors with data protection systems.

It is therefore an object of the present invention to provide improved data protection including both backup and archive capability in a data processing environment.

It is a further object of the present invention to provide data protection including backup and archive services in a client/server environment.

It is a further object of the present invention to provide data protection by transferring a minimum amount of data across communication link.

It is a further object of the present invention to eliminate the data protection gap inherent to backup technology by protecting information up to the last instant using low-cost streaming media.

It is a further object of the present invention to protect data from software and user errors by providing a storage archive for older versions.

It is a further object of the present invention to use inexpensive streaming media, e.g., tape, for backup storage.

It is a further object of the present invention to provide a cost and time-effective method for providing an archive mirror using inexpensive streaming media.

It is a further object of the present invention to convert a write event journal into a delta.

It is a further object of the present invention to convert a write event journal into a map of changed segments that can be queried with respect to linear offset.

It is a further object of the present invention to enable use of a read-only base stream and an event log as a readable, seekable and writeable stream.

It is a further object of the present invention to provide an apparatus and method for combining a plurality of write event journals with a read-only non-seekable base stream to produce an updated stream.

It is a further object of the present invention to provide an apparatus and method for presenting a changing base file for an inverse write event journal as an unchanging base file.

SUMMARY OF THE INVENTION

The present invention enables a broad collection of useful behaviors including operating with streaming media. Via the creation and use of an event map, the present invention is useful for more than backup and in particular includes a combination event journal and an ordered container. Through the use of an event map, the present invention enables, for example: an event log to be merged with a non-seekable stream; an event log to constitute a readable and writeable file; the use of only an event log to imitate a readable and writeable file; and an event log and a seekable readable file to imitate a readable and writeable base file. The present invention also supports use of streaming media in data protection applications previously restricted to random access media.

It is apparent that reliable and low-cost data protection is a formidable task. On one hand, conventional backup technology is cumbersome and the most recent data is always at risk. On the other hand, mirroring techniques instantly propagate errors to the backup storage, and large-scale deployment of mirroring is impractical because of hardware and costs. The present invention addresses these two major deficiencies of current data protection systems by providing up to the instant protection using low-cost media while causing minimum network transfer overhead.

BRIEF DESCRIPTION OF THE DRAWINGS

FIG. 1D illustrates an exemplary event journal according to an embodiment of the present invention.

FIG. 2A illustrates an exemplary event map according to an embodiment of the present invention.

FIG. 5 illustrates an exemplary method for converting an event journal to a delta according to an embodiment of the present invention.

DETAILED DESCRIPTION OF THE INVENTION

Figure 1A:
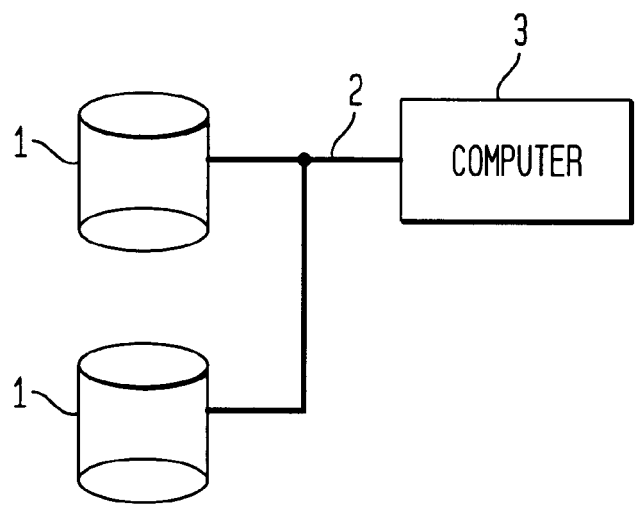
FIG. 1A illustrates a computer and computer storage devices according to an exemplary embodiment of the present invention.

FIG. 1A shows a computer system 3 having, for example, two random access primary computer storages 1 attached via connection 2. The computer storages 1 are used, for example, to store computer data during normal operation of the computer system 3.

Figure 1B:
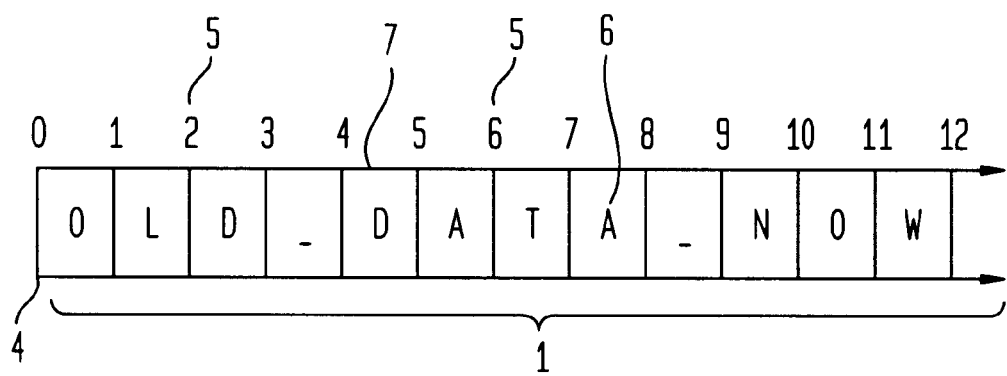
FIG. 1B illustrates exemplary storage units according to an embodiment of the present invention.

FIG. 1B shows a more expanded view of a computer storage 1, showing elemental storage units 7, each having an address 5 and resident data, 10, e.g., "OLD_DATA_NOW". The storage addresses 5 for each elemental storage unit 7, for example shown having values 0–12, indicate the number of primary storage units the current storage unit is offset from the storage origin 4.

The elemental storage units 7 illustrated in FIG. 1B are populated with, for example, ASCII byte codes. While the illustrated embodiment of the present invention recites fixed length storage units, a storage unit may contain a byte as illustrated, a disk block, a database record, or any other fixed length unit that satisfies the natural addressing convention of the particular computer. Storage units 7 may also be empty. During normal operation of the computer system 3, information is written to the elemental storage units 7. When new information is stored in a location, overwriting destroys the old information. In certain prior art systems, the old data is copied to a temporary area before overwriting occurs.

Figure 1C:
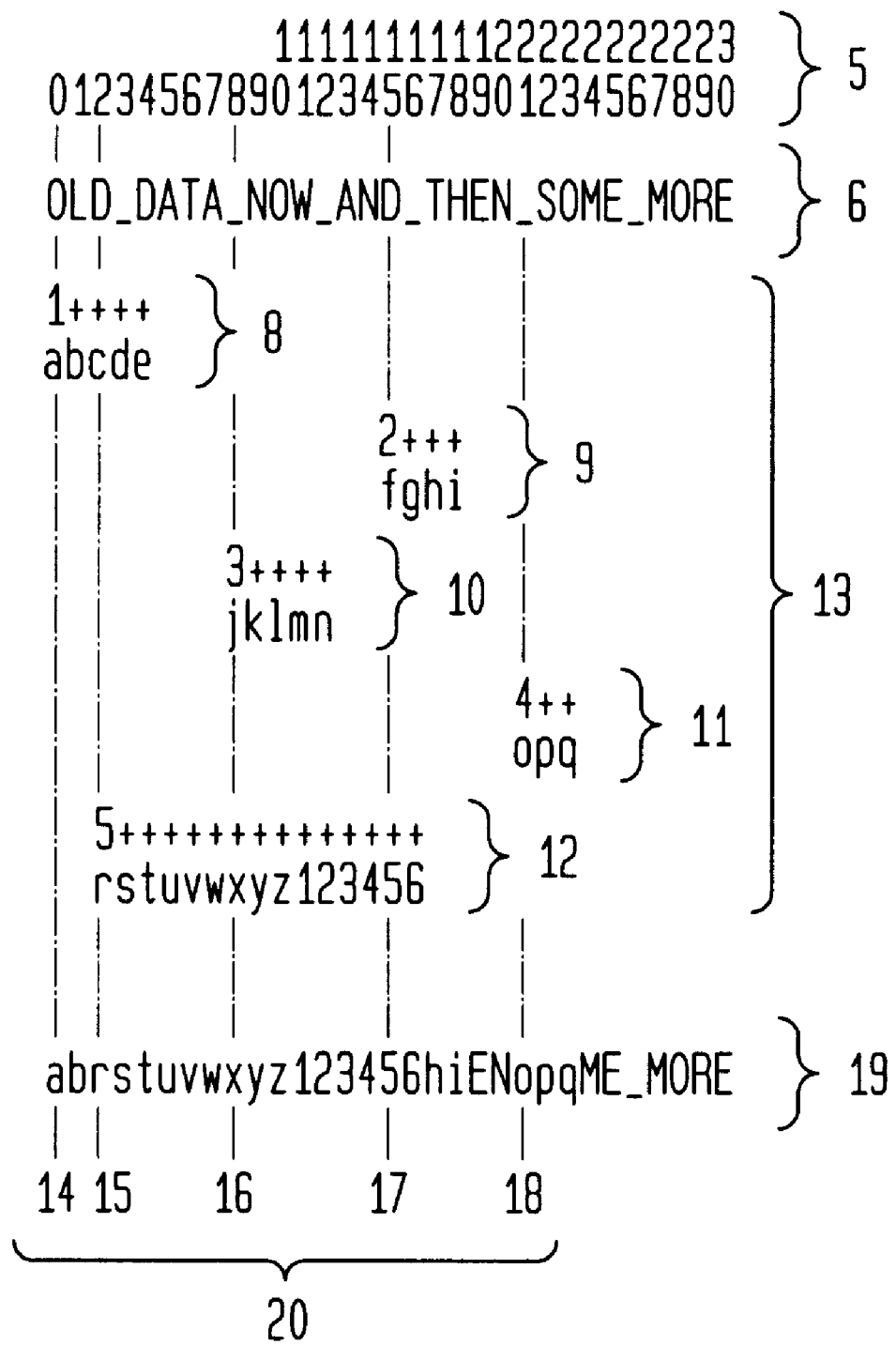
FIG. 1C illustrates the effects of write events and addressing in a computer storage device according to an exemplary embodiment of the present invention.

FIG. 1C illustrates an original computer storage 1 containing original data 6. A collection of write events, for example indicated at 8, 9, 10, 11, 12 each result in a change to computer storage 1 by overlaying data already there. For example, each write event including the data written and an address from the origin of the computer storage is indicated by 8–14, 9–17, 10–16, 11–18, 12–15as shown in FIG. 1C. The series of write events 13 resulting in a change in the data of the original storage 6 results in an updated storage 19.

FIG. 1D illustrates an exemplary event journal. For the purposes of the present invention, the event journal may result from practice of any of the prior art methods recited above or an equivalent. Each event journal entry must include at least an event address 22 and the data recorded 24 during the write event. Note that number of elemental storage units written, or the event size 23, is a characteristic of the data written.

Each event entry in the event journal has an offset from the origin of the event journal. Each event entry also contains the data written to the original file. The data written to the original file also has an offset in the event journal. This offset is, for example, the event data address 25. This event data address is used to construct the marker data pointer later described. The event journal is organized as follows. Assuming, for example, that the event address 22 and the event size 23 are each 8 bit values, then the first event data 24, "abcde", is stored at starting location 16, as shown in FIG. 1D and would end at location 20. Also as shown in FIG. 1D, the next event data, "fghi", is located at address 37 in the event journal which reflects the five address locations occupied by the first event data 24 plus the 16 bits occupied by the next event address 22 and event size 23. The remaining entries in the event journal are determined in the same manner.

For the purposes of simple illustration, all of the write events in this description apply to a single computer storage. The same methods also apply, however, to a computer or network of computers each having a plurality of storages. For systems having a plurality of storages, it is common to include checkpoint events. Checkpoint events contain markers that indicate stable or committed instants where data in a plurality of storages is synchronized or valid. Checkpoints often facilitate recovery to a particular point in time for systems having a plurality of storages.

It is important to note that the events in the event journal are recorded in the same sequence that they occurred on the computer storage. Since this sequence is random with respect to the position in the original computer storage, there is no efficient way to determine the events which affected a particular storage offset without processing every event in the event journal.

The present invention uses an event map, or plurality of event maps, created from an event journal to ascertain the cumulative effects of a series of write events on original computer storage.

Figure 2C:
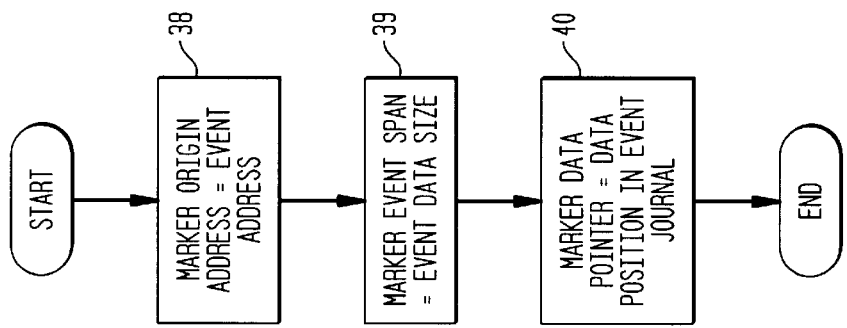
FIG. 2C illustrates an exemplary method for creating a current event marker according to an embodiment of the present invention.
Figure 2B:
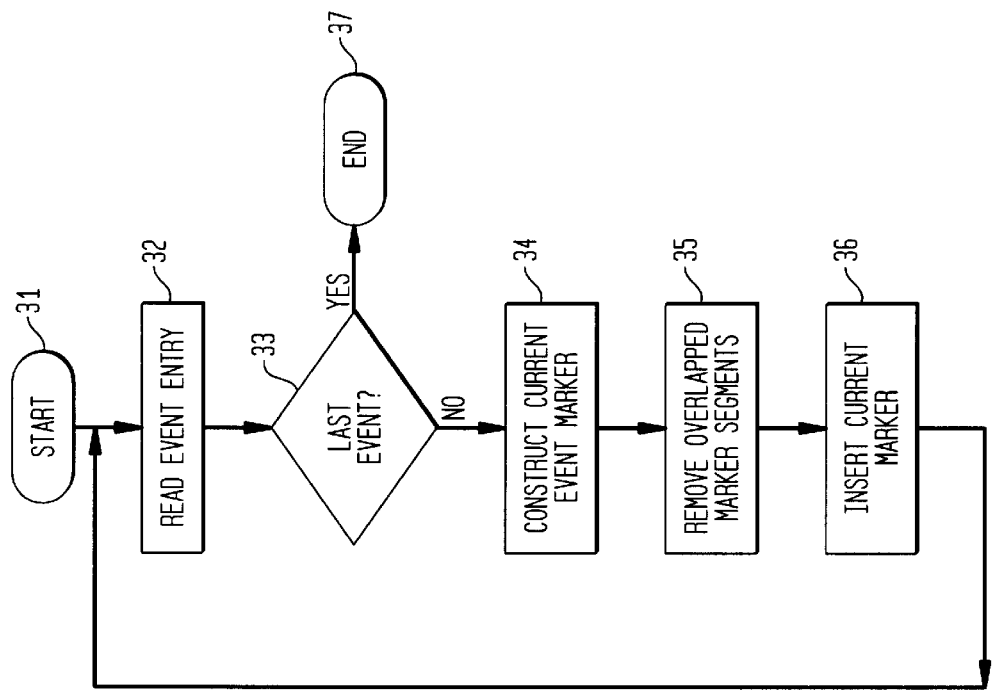
FIG. 2B illustrates an exemplary method for creating an event map according to an embodiment of the present invention.

FIG. 2A shows an event map according to an embodiment of the present invention. FIG. 2B shows high level logic flow chart of an exemplary embodiment of the present invention for generating an event map. With reference now to FIGS. 2B–2E and source code pages 33–34 and 23–26 of the attached paper appendix and with particular reference to the source code routine entitled JournalServiceBase:RegisterEvent, the method according to the present invention proceeds as follows.

As indicated in FIG. 2B, each event entry is loaded at step 32 and checked to see if it is a final event or a synchronization event indicating that the process should halt at step 33. If the event entry is not a final event, a current event marker is generated for the event at step 34. The event map is then searched for any marker segments that overlap the current marker and overlapping markers are removed at step 35. Finally, the current marker is inserted into the event map at step 36. The process continues until the last event is processed.

FIG. 2C illustrates an exemplary method for constructing a current event marker from an event entry according to an embodiment of the present invention. As shown in FIG. 2A, the current event marker comprises at least three components: a marker origin address 26 corresponding to the event data address of the loaded event entry; an event marker span 27 containing the number of primary storage units that were written in the event entry; and a marker data pointer 28 comprising an address or offset in the event journal which enables the event data to be quickly located in the event journal.

For the purposes of illustration, exemplary generation of the event map is described from beginning to end. The method according to the present invention is useful if the event journal is stored on streaming media or if a backup computer is recording an event journal and simultaneously generating the event map.

Also according to the method of the present invention, an event map can be constructed by processing event journal entries in reverse order, from end to beginning. The mechanics are somewhat different because events encountered first, i.e., last in the journal, will take precedence over those earlier in the journal. The flow chart of FIG. 2B would, instead of removing earlier events, first search for segments referenced in the event map. The overlapping segments found in the event map are omitted from the current marker. Note that the current marker can be fragmented into a plurality of markers each representing changes for the current event entry.

Figure 2D:
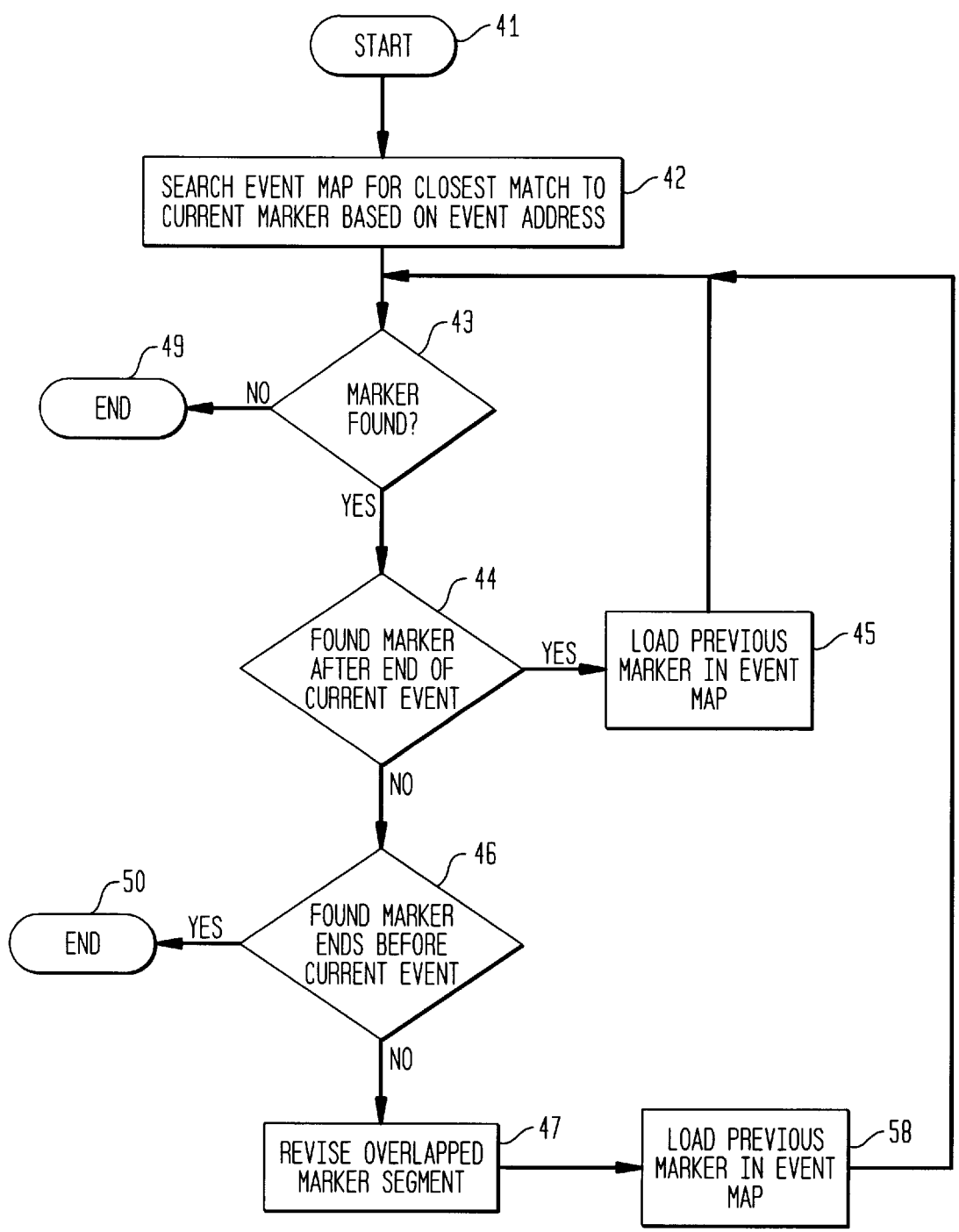
FIG. 2D illustrates an exemplary method for removing overlapped marker segments according to an embodiment of the present invention.

FIG. 2D further describes an exemplary method for clearing overlapping markers from the event map according to an embodiment of the present invention. The event map is searched for the event closest to the current event marker in step 42. When no event is found, the event map is empty and there is no overlap with any other event and the method returns, at step 43, so that the current event marker can be inserted into the event map.

If an event is found, there are several possible conditions. The found event may start after the end of the current event in step 44. If this is the case, the previous event in the event map is loaded in step 45. If no such event entry exists in step 45, the method returns to step 43. Otherwise, the found event may end before the current event indicated in step 46. If this is the case, then no more events overlap the current event and then the method returns in step 50.

The final possible condition is overlap. Overlap occurs when part of the current marker sits on top of a found marker entry. When this occurs, the found marker entry must be revised or removed to make way for the current marker entry in step 47. After the marker is revised in step 47, the previous event marker is loaded and the process continues until an exit condition is encountered in steps 43 or 46.

In a storage system, overlap occurs when a write occurs to the same location in a particular file. Many writes may occur to a file position resulting in many event entries referencing a particular storage location. Only the last write to the file position determines the data stored there. Equivalently, only the last event entry in the event journal defines the event marker for corresponding to that address in the event map.

The present invention uses a sorted container, such as a link list, array or btree, to contain the event markers. An example of a sorted container by Azarona Software employed in an exemplary embodiment of the present invention is included in the source code with particular reference to, for example, pages 105–117 of the attached paper appendix Event markers are stored in order of event marker address. Sorting enables rapid location of markers relating to an event marker address. The process of inserting and deleting whole markers in the list can be time consuming, especially if the list or btree is large. The present invention practices two techniques for improved performance when lists become large. The first practice is known as marker editing. Editing modifies an existing entry in a list when it is known that the edits do not affect the sequence represented by the list. In most cases, editing an existing marker is many times faster than deleting and reinserting a tree entry or sorted list entry.

The practice of marker editing is particularly demonstrated, for example, in the Vtree::UpdateData routine particularly referenced on, for example, page 110 of the source code in the attached paper appendix. Marker editing techniques are further demonstrated in source code at, for example, page 26 line 368 in the attached paper appendix.

The second technique practiced according to the present invention is subdivision. It is well known in the art that the amount of effort to maintain a sorted container increases disproportionally to the number of items in the list. The present invention can divide a large journal into a plurality of smaller segments and generate an event map for each journal segment.

There are several overlap conditions that can occur. A current event marker may overlap several markers, for example as illustrated in FIG. 1C by events 8, 9, 10 overlapped by entry 12. A current marker may overlap a complete marker illustrated by event 10 being completely overlapped by event 12. A current marker may also overlap the trailing side of a current marker, illustrated by event 8 and event 12. A current marker may overlap the front side of a marker illustrated by event 9 and event 12.

Figure 2E:
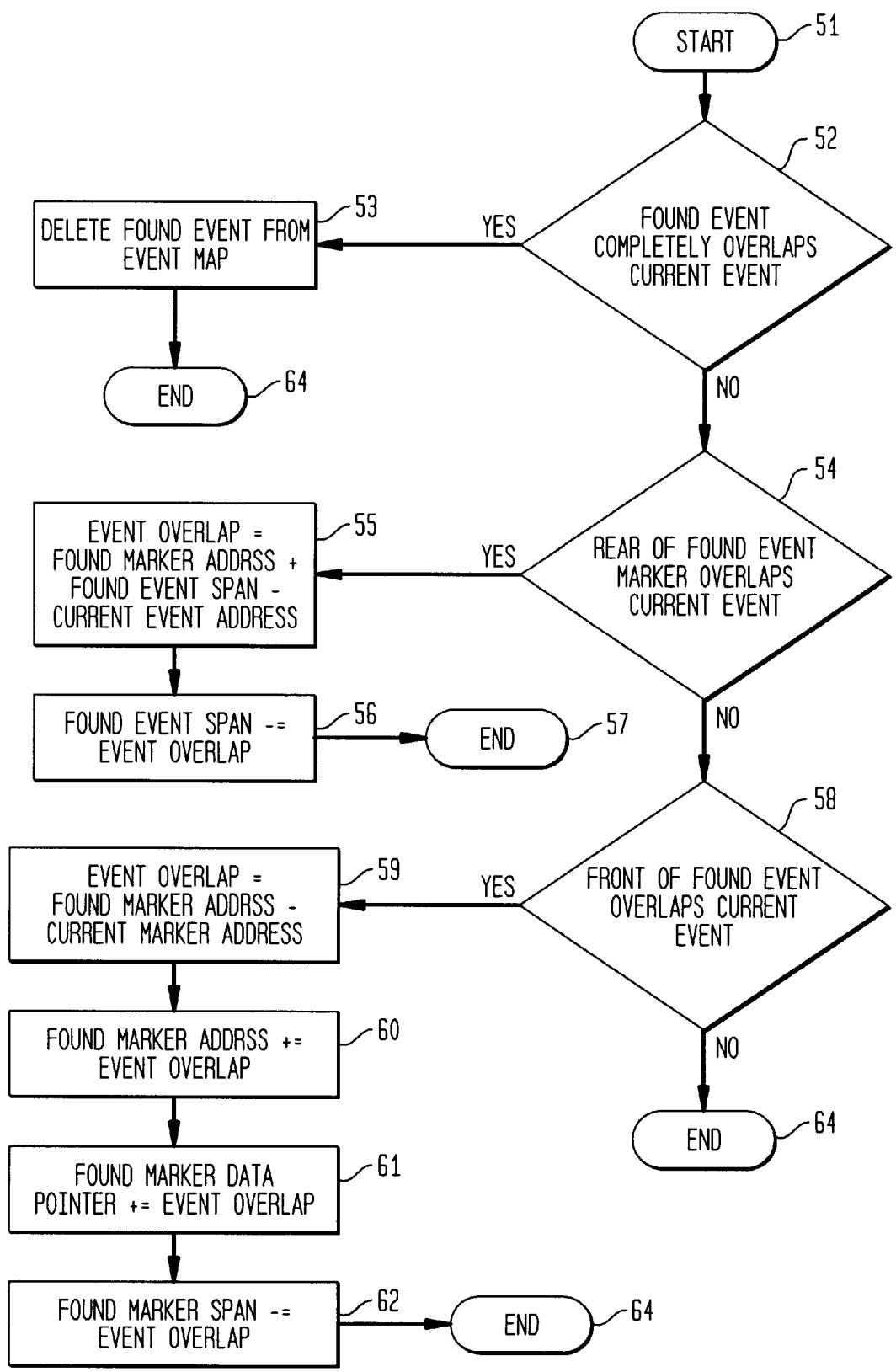
FIG. 2E illustrates an exemplary method for revising an overlapped marker according to an embodiment of the present invention.

FIG. 2E illustrates an exemplary technique for revising an overlapped event marker according to the present invention. If the current event marker completely overlaps the found marker in step 52, the overlapped marker is deleted in step 53. If the current event marker overlaps the tail of the found event marker in step 54, the found event marker is rear trimmed by reducing the event data size represented in the found event marker in steps 55 and 56. If the front of the found event overlaps the found event in step 58, the found event is front trimmed by calculating the size of the overlap in step 59, increasing the event marker offset by the overlap in step 60, adjusting the marker data pointer to reflect the first data that was not overwritten in the event journal by adding the overlap to the marker data pointer in step 61, and finally reducing the data size of the found marker in step 62.

It is considered within the scope of the present invention to use marker editing techniques to replace a marker entry deletion and insertion when the deleted and inserted markers go into the same place in the sorted container.

The event map according to the present invention is useful for a variety of purposes. It is well known to create a backup of a computer by copying an original storage to a streaming media. Prior art systems describe methods for recovering from an event journal by copying a backup onto a hard disk and "replaying" the events in an event journal. This technique only works, however, if the number of events in the event journal is small enough to replay in a reasonable amount of time. For example, if a large volume of changes are stored in an event journal, replaying the entire event journal to recreate a file could take a prohibitively long time. Thus, such a technique is impractical for sustained off-site backup maintenance. The requirement to periodically refresh the entire backup creates a huge amount of network traffic and disqualifies this method from use for large systems. In addition, the prior art systems require the intermediate step of placing the original data file on a seekable medium prior to replaying the event journal to recreate a file. On conventional tape back-up systems, however, only a small amount of disk space is available, if at all, and thus the original file cannot be placed on disk for merging with an event journal as is done via an event map according to the present invention.

In contrast, the event map of the present invention enables efficient updating of a backup stored on streaming media. For example, by creating the event map according to the present invention, the net result of the changes in the event journal are combined with the original file, thus reducing the amount of network traffic associated with the back-up or recreation process and there is no requirement for an intermediate step of placing the original file on a seekable medium as the event map can be combined sequentially with the original file.

As indicated earlier, it is well known in the art that a backup comprises a copy of an original storage and that backup copies are often stored on streaming media because streaming media is cheaper than random access media. It is also well known to store an event journal. For example, in a conventional computer system with a primary computer and a backup computer connected to a network, a copy of a base (e.g., original) file is copied from the primary computer to the backup computer. To generate a backup copy of the current state of the file, the base file would be written to a disk from the backup computer for combination with the changes to the base file, stored as an event journal on the backup computer, thus necessitating many I/O operations as described earlier. The updated file would then be stored in the backup system. In addition to requiring transfer from a backup streaming media to a disk to generate an updated backup copy of a file, such a backup system also generally does not provide the capability to incorporate only recent changes to the base file, which may no longer exist on the backup system if replaced following a backup operation. Thus, it is not known to merge data in an event journal with an original storage stored on streaming media for recovery. It is further not known to merge data from an event journal with data in a streaming media for maintenance of a backup copy to keep the backup copy up to date in accordance with the present invention.

It is known in the art to replay recorded storage events. Replay techniques repeat the sequence of writes recorded in an event journal to a copy of an original storage stored on random-access random-writeable media. A problem with this approach is that the vast majority of the copies of original-storage are stored on streaming media, e.g., tape, which is neither efficiently seekable nor randomly writeable. As a result, event journal techniques are not used for backup.

The present invention enables efficient merging of information in an event journal with a copy of an original storage on streaming media. The methods described above relating to creation of an event map, when practiced with the following techniques to fulfill a data request from an event journal and an original storage, enable an array of new capabilities. Further disclosure of this technique is provided with reference to, for example, pages 23–26 and 33–34 of the source code in the attached paper appendix and with particular reference to the JournalServiceBase::QueryLocation subroutine.

Figures 3, 4A:
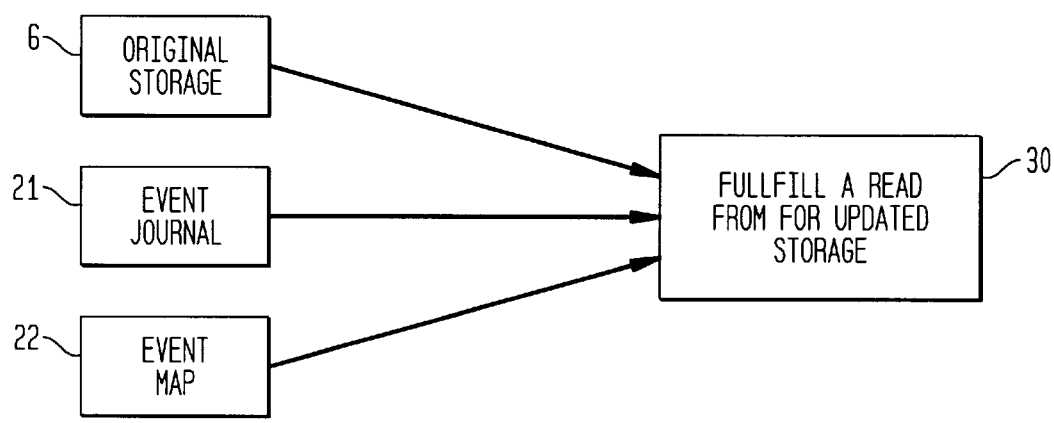
FIG. 3 illustrates an original an updated storage according to an exemplary embodiment of the present invention.
FIG. 4A illustrates exemplary components for fulfilling a read request according to an embodiment of the present invention.

FIG. 4A illustrates exemplary components of the present invention that participate in fulfilling a read request 30 for an updated storage, an original storage 6, an event journal 21 and an event map 29. The flowchart of FIG. 4B describes an exemplary method for fulfilling a read request from the combination of FIG. 4A comprising an original storage 6, an event journal 21 and an event map 29. A read request is composed, for example, of two elements: a data position; and a read size. The data position gives, for example, the starting address relative to an origin of the data to be read. The read size gives, for example, the count of elemental units to be obtained from the storage. The sum of the data position and the read size gives the address of the ending read address.

Figure 4B:
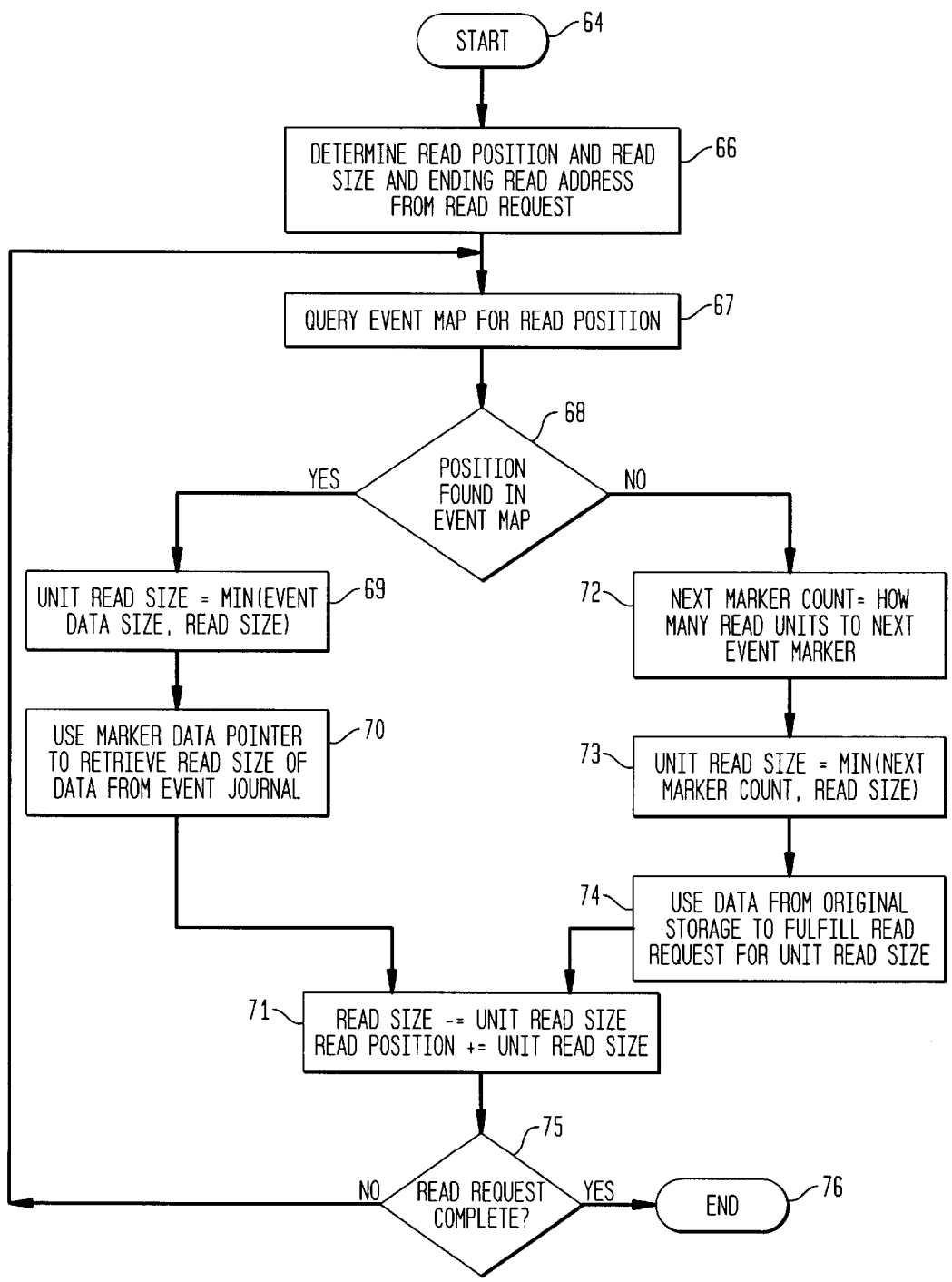
FIG. 4B illustrates an exemplary method for fulfilling a read request according to an embodiment of the present invention.

With reference to FIG. 4B, the first step 66 in processing a read request is to determine the data position, read size, and ending read address 32. The event map is queried for a marker that contains the current read position in step 67. If no marker references the current read position in step 68, the number of storage units until the next read marker is retrieved in step 72, the next marker count. The unit read size is calculated to be the minimum of the next marker count and the read size in step 73. Data from the original storage is copied into the read buffer to fulfill the unit read count of primary storage elements in step 74.

If an event marker is found which corresponds to the read position in step 68, the unit read size is calculated to be the minimum of the overlapping marker segment size and the read size in step 69. The marker data pointer is used to locate the corresponding event data in the event journal and fulfill the request for unit read size from the event journal in step 70. Next, the read size is decremented by the number of elemental storage units fulfilled, unit read size, in the last iteration, and the read position is advanced by the unit read size to indicate partial fulfillment of the read request in step 71. When the read size reaches zero, the read is fulfilled in step 75 and the process terminates in step 76. If the read size is not zero, the process resumes by querying the event map in step 67.

Figure 4C:
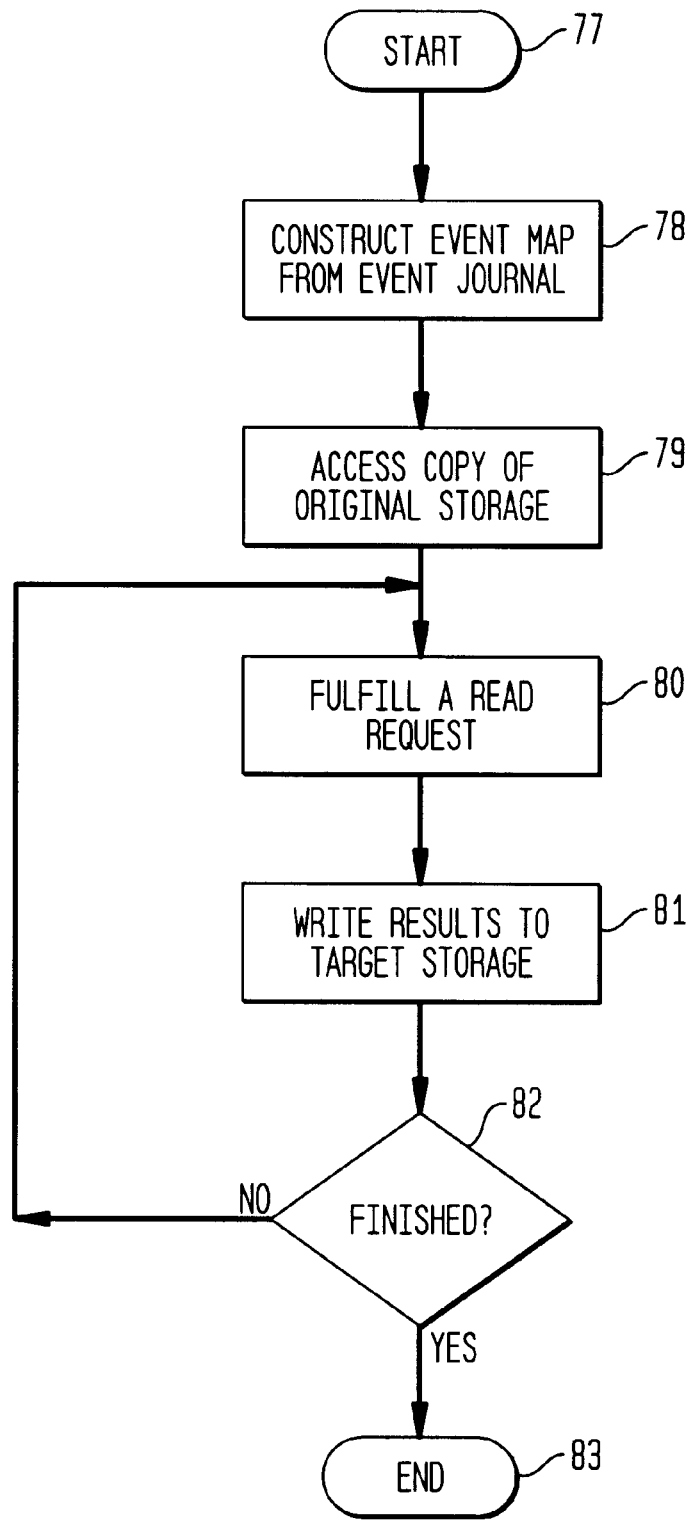
FIG. 4C illustrates an exemplary method for building a stream according to an embodiment of the present invention.

Application of the read method according to the present invention to cause sequential reading of an updated stream from beginning to end is an efficient way to merge an original stream and an event journal. FIG. 4C shows an exemplary flow chart that generally describes the method according to the present invention. This method is further disclosed in source code form at, for example, pages 9–10, 15–18, 19–20, 23–26, 30–31 and 33–34 in the attached paper appendix. The source code references four similar but distinct uses of the present invention. Each of these several behaviors can be, for example, invoked by program options.

As illustrated in FIG. 4C, in a method for merging a non-seekable base stream with an event log, an event map is constructed from the event journal as described above in step 78. A copy of an original storage on a streaming media is loaded into a tape drive in step 79. A series of read requests requesting consecutive segments of data from the updated storage represented by the combination of the original storage and the event journal are issued and fulfilled by, for example, the method of FIG. 4B in step 80. The results of the read requests are subsequently recorded to a target storage which may be another streaming media, disk or other storage in step 81. The process continues until complete in steps 82 and 83.

The sequential read process, the subject of FIG. 4B and source code disclosure at, for example, page 20 the attached paper appendix, causes the copy of the original storage to be consumed from beginning to end. The seeks which occur to the original storage advance the original storage beyond the same number of primary storage units supplied by the event journal. As a result, the original storage is consumed from beginning to end without seeking notwithstanding skipping of data units provided by the event journal. This characteristic enables efficient combination of an original computer storage and an event journal.

Seeks on the original storage serve to skip data segments provided by the event journal. Co-pending application by applicant, entitled COMPUTER APPARATUS AND METHOD FOR MERGING A SEQUENTIAL PLURALITY OF DELTA STREAMS recites a method and apparatus to capture skipped segments into an inverse delta. When processing a stream from beginning to end, the act of discarding characters is awkward. In practice, seeks in the original media only occur when a segment from the original storage has been overwritten. The normal effect of this on an original stream is to skip the overtyped characters. As recited above, the means of skipping overtyped characters is to discard them. The present invention includes, for example, methods compatible with co-pending application entitled COMPUTER APPARATUS AND METHOD FOR MERGING A SEQUENTIAL PLURALITY OF DELTA STREAMS which, for example, captures an "inverse delta" which is a list of changes that if made to the updated storage convert it back into an original storage. The present invention also produces inverse deltas. The method simply requires capturing elemental storage units skipped in the original stream as mismatch segments and recording data segments used from the original stream as matching segments.

It is similarly an object of the present invention to translate an event journal into a delta. A delta contains, for example, alternating frames describing matching and mismatching sections of an original and updated storage. The method is disclosed in source code with reference to, for example, pages 12, 21–22, 32, and 33–34 of the attached paper appendix with particular reference to the class named JournalDelta.

The flow chart of FIG. 5 illustrates an exemplary embodiment of a method for converting an event journal to a delta according to the present invention. An event map is constructed for the event journal in step 85. A variable tracking the logical progress through the updated stream is initialized in step 87. This variable tracks the position accounting of the updated file. This logical position advances resulting from an accounting for storage units in the updated stream. Each time this position advances, the curposition variable is advanced in step 94.

When the curposition variable reaches a known EOF condition, the method terminates in steps 88 and 95. For all other times, the event map is queried for the curposition in step 89. When the query returns with a match marker notification, the match marker is used to construct a data frame. The data frame specifies a mismatch in the original and updated storages. The data frame comprises effectively the data that was not matched. The mismatching data is extracted from the event journal using the marker data pointer and the marker data size and incorporated into the data frame.

When the query returns no match marker notification in step 90, the data from the original and updated streams are identical until the next match marker. In an embodiment of the present invention, a count of primary storage units is returned until the event address of the next event marker. The curposition variable and this count are used to construct the match frame in step 93. The match frame tells the position and count of characters that match in the original and updated storage. The match frame notification comprises a position element and a size element indicating the position and number of characters that match in the original and update streams.

Finally, the generated frame is recorded in step 94 and the process resumes. The curposition is incremented to account for data represented by the current frame in step 94 and the process resumes by checking if the storage is complete in step 88. If not, the process above repeats until all elemental storage units of the updated storage are accounted for. The delta of the present method is particularly useful when used in conjunction with co-pending applications entitled COMPUTER APPARATUS AND METHOD FOR MERGING A SEQUENTIAL PLURALITY OF DELTA STREAMS and COMPUTER APPARATUS AND METHOD FOR MERGING SYSTEM DELTAS.

Read-only files are well known in the art. They are common to write-once media such as CD-ROMs and the like as well as network file systems where a user may lack permission to or the ability to modify a particular storage. The present invention further provides a means of using a combination of a read-only storage, an active event journal and an event map as a seekable-readable-writeable storage. The method is generally disclosed in source code at, for example, pages 9–10, 15–18, 19–20, 23–26, 30–31 and 33–34 of the attached paper appendix. The flowcharts of FIG. 6A–6C generally describe an exemplary method according to the present invention.

Figure 6A:
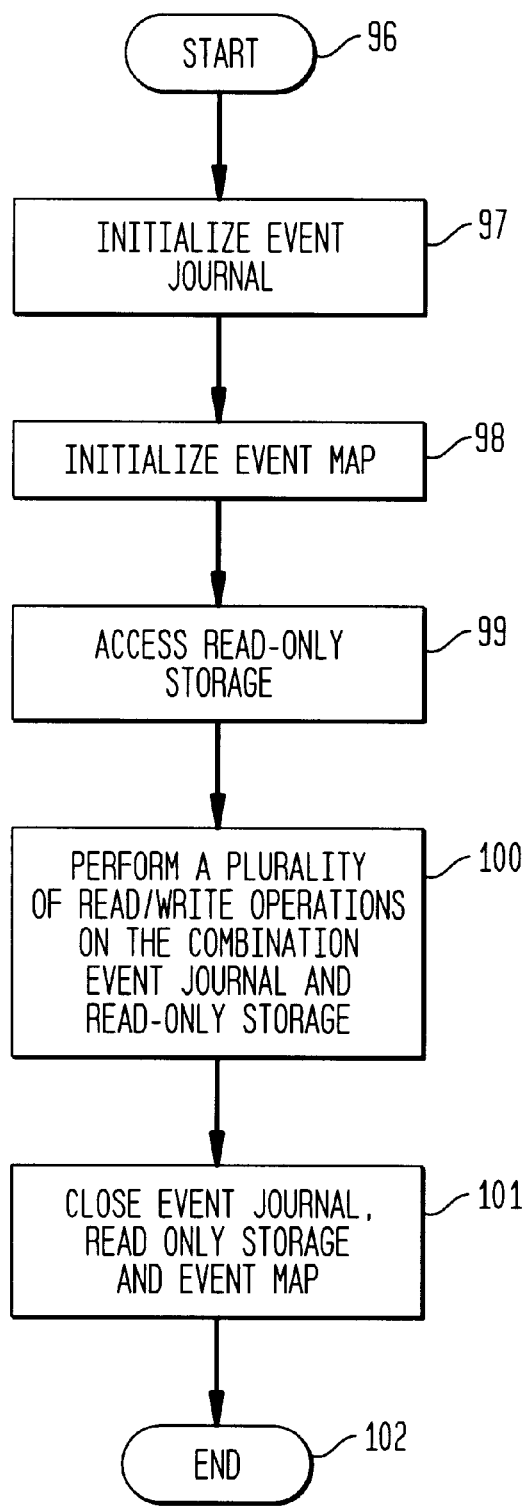
FIG. 6A illustrates an exemplary flow chart showing how to use a read-only storage and an event journal as a seekable, readable and writeable storage according to an embodiment of the present invention.

The method of FIG. 6A includes, for example, the step of initializing an event journal in step 97. Initialization may be, for example, creation of a new event journal or activation of an existing journal. If the session refers to a continuation of an earlier session, the storage associated with the event journal is opened for reading and writing. If this is a new session, an event map is created, otherwise an earlier event map is activated in step 98. The event map and the event journal should be consistent. Note that if an event journal exists but no event map exists, the above method for generating an event map from an event journal is used. The final step is to open the read only storage in step 99. Note that by definition the read-only cannot be modified.

Figure 6B:
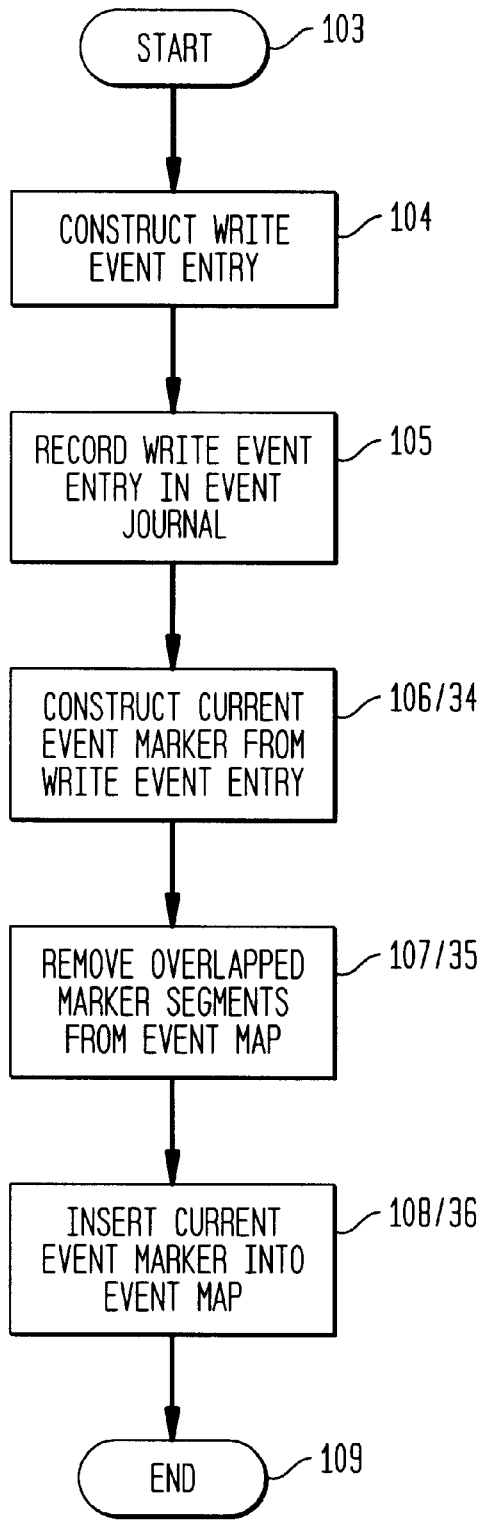
FIG. 6B illustrates an exemplary flow chart showing how to write to a read-only storage and event journal combination according to an embodiment of the present invention.
Figure 6C:
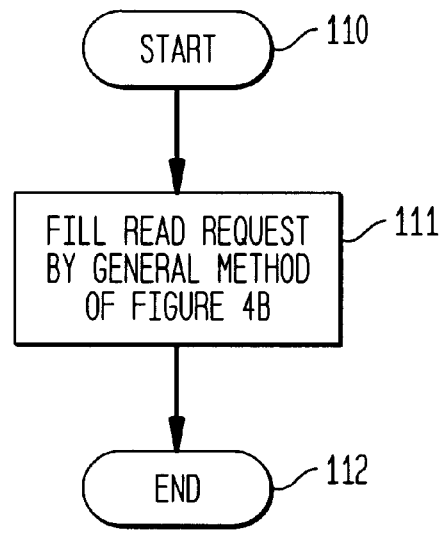
FIG. 6C illustrates a read from a read-only storage and event journal combination according to an embodiment of the present invention.

After initialization of the event journal, event map and read only storage, read and write accesses to the storage are performed as generally described in step 100, and specifically performed as described in FIGS. 6B and 6C. With further reference to FIG. 6B, the present invention diverts writes that would normally apply to the read-only storage to the event journal. This diversion is performed by first constructing a write event entry from the write request by determining the data and position represented by the write request. The data position is used as the event address. The data included in the write request is used as the event data.

The write event entry is recorded into the event journal in step 105. Subsequently, the event entry is used to construct a current event marker in step 106 using, for example, the method generally represented in FIG. 2C. The event map is searched and all overlapping segments that overlap the current event marker are removed in step 107 using, for example, the method generally represented in FIG. 2D. Finally, the current event marker is added to the event map in step 108.

Read requests to the combined read-only storage, event journal combination are generally processed using the method illustrated, for example, in the flowchart of FIG. 6C. Instead of reading the source file, the read request is diverted and fulfilled by the method generally represented by FIG. 4B. The combination of using this read and write method provides a readable and writeable interface to a read-only storage.

The technique according to the present invention can be used, for example, to provide a plurality of interfaces to a read-only file. Consider, for example, a group of users all having access to a read-only storage but desiring to make changes to this storage. The method according to the present invention can be applied for each user who generates an independent event log that contains only the changes made by the user. These changes are invisible to the other users permitting each user to change his data view as necessary.

A similar application of the present invention uses the above method for simulation of a standard file interface using only a read only original storage and an event log in the absence of the read only file. If the read-only file above contains no data then the event journal contains all of the subject data. This capability permits a readable writeable and seekable file system to be created on a seekable write-once media like a CD-ROM. The method involves creating the event journal on CD-ROM and using the read and write simulation methods disclosed in the previous section to fulfill all read and write requests.

What is claimed is:

1. A method for creating an event map from an event journal, comprising the steps of:

reading each of a plurality of write event entries from an event journal;

generating a current event marker for each of the plurality of write event entries; and determining if an overlap condition exists between a latest current event marker and an existing current event marker and if an overlap condition exists, removing the overlap condition to represent the latest current event marker.

2. The method according to claim 1, wherein the step of determining and removing the overlap condition includes comparing the latest current event marker and the existing current event marker to identify an overlapped portion.

3. The method according to claim 1, wherein the event journal includes the plurality of write events stored in a computer memory device, the computer memory device having an array of storage units each having a predetermined address.

4. The method according to claim 3, wherein each of the plurality of write events includes at least an event address and an event data, the event address representing a location of the write event in the computer memory device and the event data including a content of the storage units occupied by the write event.

5. The method according to claim 1, wherein the current event marker includes at least a marker origin address, a marker event span and a marker data pointer, the marker origin address representing a location in the computer memory device, the marker event span representing a number of occupied storage units, and the marker data pointer representing a pointer to an event data in the computer memory device.

6. The method according to claim 1, further comprising the step of storing each of the plurality of current event markers in a sorted list.

7. The method according to claim 2, wherein the step of removing the overlap condition includes one of deleting the overlapped portion and revising the overlapped portion.

8. The method according to claim 3, wherein the array of storage units stores one of bytes in a computer file, blocks in a computer disk and records in a database.

9. The method according to claim 1, wherein the event journal is stored on a backup computer system, the backup computer system being coupled to a primary computer system, and further comprising the step of storing each current event marker on the backup computer system, and wherein the steps of generating the current event marker and determining and removing the overlap condition are performed on the backup computer system.

10. The method according to claim 1, wherein the steps of generating the current event marker and determining if an overlap condition exists are performed immediately after the step of reading each of the plurality of write event entries.

11. The method according to claim 4, further comprising the step of, when a write event entry occurs only at a block boundary and an event size equals a block size, storing each current event marker in an array of storage marker pointers containing one of a null value and the marker data pointer, the null value indicating an original storage block not changed by a write event entry and the marker data pointer indicating the original data block changed by the write event entry.

12. The method according to claim 1, further comprising the step of dividing the event journal into a plurality of segments and wherein the step of reading each of the plurality of write events includes reading each of the plurality of write events for a respective one of the plurality of segments.

13. A method of fulfilling a read request for an updated storage using an original storage, an event journal and an event map, the method comprising the steps of:
receiving a read request, the read request including a data position and a read size;
identifying, from the read request and via the event map, portions of the read request to be provided by the event journal and portions of the read request to be provided by the original storage; and
fulfilling the read request.

14. The method according to claim 13, wherein the data position represents an offset from an origin of the updated storage and the read size represents a number of storage units to be read from the updated storage, the updated storage containing a data content of the original storage and subsequent changes to the original storage via a plurality of write events.

15. The method according to claim 13, wherein the original storage includes a computer memory device having an array of storage units each having a predetermined address, the event journal being stored in the computer memory device, the event journal including a plurality of write event entries.

16. The method according to claim 15, wherein each of the plurality of write event entries includes at least an event address and an event data, the event address representing a location of the write event in the computer memory device and the event data including a content of the storage units occupied by the write event.

17. The method according to claim 16, wherein the event map is created from the event journal via:
reading each of the plurality of write event entries from the event journal;
generating a current event marker for each of the plurality of write event entries; and
determining if an overlap condition exists between a latest current event marker and an existing current event marker and if an overlap condition exists, removing the overlap condition to represent the latest current event marker.

18. The method according to claim 17, wherein the current event marker includes at least a marker origin address, a marker event span and a marker data pointer, the marker origin address representing a location in the computer memory device, the marker event span representing a number of occupied storage units, and the marker data pointer representing a pointer to an event data in the computer memory device.

19. The method according to claim 13, wherein the original storage is empty.

20. The method according to claim 13, wherein the original storage includes a read only storage device.

21. The method according to claim 13, wherein the step of fulfilling the read request includes reading the requested data from a respective one of the original storage and the event map as determined via the identifying step.

22. The method according to claim 21, wherein the step of fulfilling the read request further includes reading each contiguous segment of the original storage and recording a result of the read request on a second storage media.

23. The method according to claim 22, wherein the second storage media includes one of a streaming backup tape and a seekable disk.

24. The method according to claim 13, wherein the original storage resides on a streaming tape and the streaming tape is not repositioned during the step of fulfilling the read request except to skip overlaid data segments from the event journal.

25. The method according to claim 22, wherein the event journal includes a plurality of event journals.

26. A method for converting an event journal into a delta, comprising the steps of:
generating an event map from an event journal;
identifying, via the event map, a mismatching segment between an original storage and an updated storage;
recording a mismatch marker for each mismatching segment;
identifying, via the event map, a matching segment between the original storage and the updated storage; and
recording a match marker for each matching segment.

27. The method according to claim 26, wherein each match marker represents a position and a size of a matching segment in the original storage and the updated storage and each mismatch marker represents a position, a size and a data content of a mismatching segment between the original storage and the updated storage.

28. The method according to claim 26, wherein the step of identifying a mismatching segment includes identifying the mismatching segment as a function of an entry in the event map using a marker data pointer to supply a data content from the event journal.

29. The method according to claim 26, wherein the step of identifying a matching segment includes identifying an omission from the event map and wherein the step of recording a match marker includes recording the match marker for each omission in the event map.

30. The method according to claim 26, wherein the updated storage is stored on a first storage device and wherein a copy of the original storage and the recorded markers are stored on a second storage device, the second storage device providing a backup of the updated storage.

31. The method according to claim 26, wherein the mismatch marker represents a size and a data content of a mismatching segment between the original storage and the updated storage.

32. The method according to claim 26, wherein the mismatch marker represents a position, a size and a marker data pointer of a mismatching segment between the original storage and the updated storage.

33. The method according to claim 30, wherein the first storage device is located on a first computer system and the second storage device is located on a second computer system.

34. The method according to claim 26, wherein the event journal includes a plurality of event journals, and wherein the generating, identifying and recording steps are performed for each of the plurality of event journals.

35. The method according to claim 26, wherein the event journal is recorded on a client server and the markers are recorded on a backup server.

36. The method according to claim 26, further comprising the step of dividing the event journal into a plurality of segments and wherein the steps of generating, identifying and recording are performed for each of the plurality of segments.

37. The method according to claim 1, wherein the event journal includes synchronization information and further comprising the step of identifying a termination condition as a function of the synchronization information.

38. The method according to claim 1, wherein the event journal includes a plurality of event journals and the steps of reading, generating and determining are performed for each of the plurality of event journals.

39. The method according to claim 1, wherein the event journal includes synchronization information comprising a plurality of checkpoint events.

40. The method according to claim 39, wherein each of the plurality of write event entries is associated with one of the plurality of checkpoint events by its offset in the event journal.

41. The method according to claim 39, wherein each of the plurality of write event entries is explicitly associated with one of the plurality of checkpoint events by a checkpoint event binding.

42. The method according to claim 39, further including generating an event map for each of the plurality of checkpoint events.

43. The method according to claim 42, the event map comprises one or more write event markers generated from the plurality of write event entries bound to at least one of the plurality of checkpoint events.

44. The method according to claim 41, further comprising generating an event map for write event entries referenced by at least one of the plurality of checkpoint events.

45. The method according to claim 3, wherein the computer memory device includes a journal computer memory device.

46. The method according to claim 4, wherein the computer memory device includes a primary computer memory device.

47. The method according to claim 46, wherein the write event address is a multiple of a block size, and wherein the write event data is a multiple of a block size.

48. The method according to claim 47, further comprising mapping a pointer in a mapped pointer array to an element of the primary computer memory device.

49. The method according to claim 48, wherein the pointer is initialized to a null value.

50. The method according to claim 47, wherein the step of determining and removing an overlap condition includes dividing the event address by the block size and accessing corresponding mapped pointer array member.

51. The method according to claim 50, further comprising installing the event address in the mapped pointer array member.

* * * * *